United States Patent

Bowen

[11] Patent Number: 4,753,780
[45] Date of Patent: Jun. 28, 1988

[54] ATOMIZING FEED FOR CRACKING UNIT
[75] Inventor: Chester O. Bowen, Borger, Tex.
[73] Assignee: Phillips Petroleum Company, Bartlesville, Okla.
[21] Appl. No.: 536,059
[22] Filed: Sep. 26, 1983
[51] Int. Cl.[4] ............................................. B01J 8/08
[52] U.S. Cl. .................................... 422/214; 208/158; 208/167; 239/432; 239/498; 239/500; 239/502; 422/144; 422/145; 422/224
[58] Field of Search .............. 422/144, 145, 140, 214, 422/224; 208/157, 158, 167; 261/78 R, 78 A; 239/8, 429, 432, 498, 500, 502, 590.5, 348

[56] References Cited

U.S. PATENT DOCUMENTS

| | | | |
|---|---|---|---|
| 2,075,867 | 4/1937 | Sampel | 239/432 X |
| 2,636,780 | 4/1953 | Barnes | 239/398 X |
| 2,775,482 | 12/1956 | Schultz | 239/398 |
| 2,786,801 | 3/1957 | McKinley et al. | 196/53 |
| 2,872,411 | 2/1959 | Krebs et al. | 208/157 |
| 2,952,619 | 9/1960 | Metrailer et al. | 208/157 |
| 3,071,540 | 1/1963 | McMahon et al. | 208/157 X |
| 3,152,065 | 10/1964 | Sharp et al. | 208/157 |
| 3,182,710 | 5/1965 | Mount | 158/77 |
| 3,353,925 | 11/1967 | Baumann et al. | 422/214 |
| 3,654,140 | 4/1972 | Griffel et al. | 208/113 |
| 3,744,386 | 2/1974 | Hite | 239/590.5 |
| 3,848,811 | 11/1974 | Fryback | 239/552 |
| 4,195,779 | 4/1980 | Auclair et al. | 239/8 |
| 4,414,184 | 11/1983 | Pinkston | 239/432 X |
| 4,427,537 | 1/1984 | Dean et al. | 208/153 X |

FOREIGN PATENT DOCUMENTS 0713406  8/1954  United Kingdom ............... 239/498

Primary Examiner—Michael S. Marcus
Attorney, Agent, or Firm—John R. Casperson

[57] ABSTRACT

A feedstock pipe for a FCC unit is provided with a plurality of turbulence generating members mounted on its interior surface. Each of the turbulence generating members has a pointed tip pointing toward the discharge end of the pipe and a ramp inclined toward the center of the pipe leading to the pointed tip.

3 Claims, 2 Drawing Sheets

ATOMIZING FEED FOR CRACKING UNIT

BACKGROUND OF THE INVENTION

The invention relates to an oil atomizer. In another aspect, the invention relates to atomizing an oil. In yet another aspect, the invention relates to atomizing an oil feed for a catalytic cracking unit.

In a fluid catalytic cracking process, it is important that the oil be vaporized prior to its contact with the catalyst to avoid excessive coke formation. Usually, the oil is sprayed into contact with the catalyst in a transfer line or riser-reactor and the radiant heat from the cracking catalyst vaporizes the oil droplets. With heavier, higher boiling feedstocks, this method of vaporizing the feedstock is not entirely satisfactory. Heavy oils, such as heavy cycle oils and vacuum residuums are difficult to completely vaporize prior to contacting with with the catalyst. Heavy reliance on radiant heat to vaporize the feedstock thus does not always provide acceptable results.

Steam is frequently used to assist in dissociation of the oil feedstock. However, the use of steam in a catalytic cracking unit can quickly become quite expensive because of the amounts involved. Also, large amounts of steam deactivate the cracking catalyst and change conditions in the riser-reactor. It would be very desirable to avoid the use of large amounts of steam for feedstock dissociation in a cracking unit if possible.

OBJECTS OF THE INVENTION

It is an object of this invention to provide an apparatus for dissociating a heavy oil feedstock which does not excessively rely on radiant heat from the catalyst or steam to provide the dissociation.

It is a further object of this invention to provide a method for dissociating an oil feedstock to avoid heavy reliance on the radiant heat from the catalyst and steam for dissociation of the feedstock.

SUMMARY OF THE INVENTION

According to certain aspects of the invention, there is provided a feed tube suitable for use in a catalytic cracking unit which has a plurality of turbulence generating members mounted on its interior surface. At least a portion of the turbulence generating members have a pointed tip pointing toward the emission end of the tubular member and a ramp portion inclined toward the longitudinal axis of the feed tube at an acute angle. The ramp portion of the turbulence generating members leads to the pointed tip and the pointed tip is positioned apart from the interior surface of the feed tube at a distance in the range of from about 0.03 to about 0.3 inside diameters of the feed tube. Steam or other atomizing gas and oil can be connected to a feed end of the tubular member and a mist of normally liquid oil feed and atomizing gas will be emitted from the upper end from whence it can be introduced into a riser-reactor for contact with hot cracking catalyst. By controlling steam and oil flow in the pipe, the normally liquid oil feedstock can be concentrated along the interior surface of the pipe where it can be blown up the ramps by the steam and vapor to the pointed tips of the turbulence generating members. From the pointed tips, the oil feed can be broken into droplets by the atomizing gas to form the mist.

DETAILED DESCRIPTION OF THE INVENTION

Figure 1:
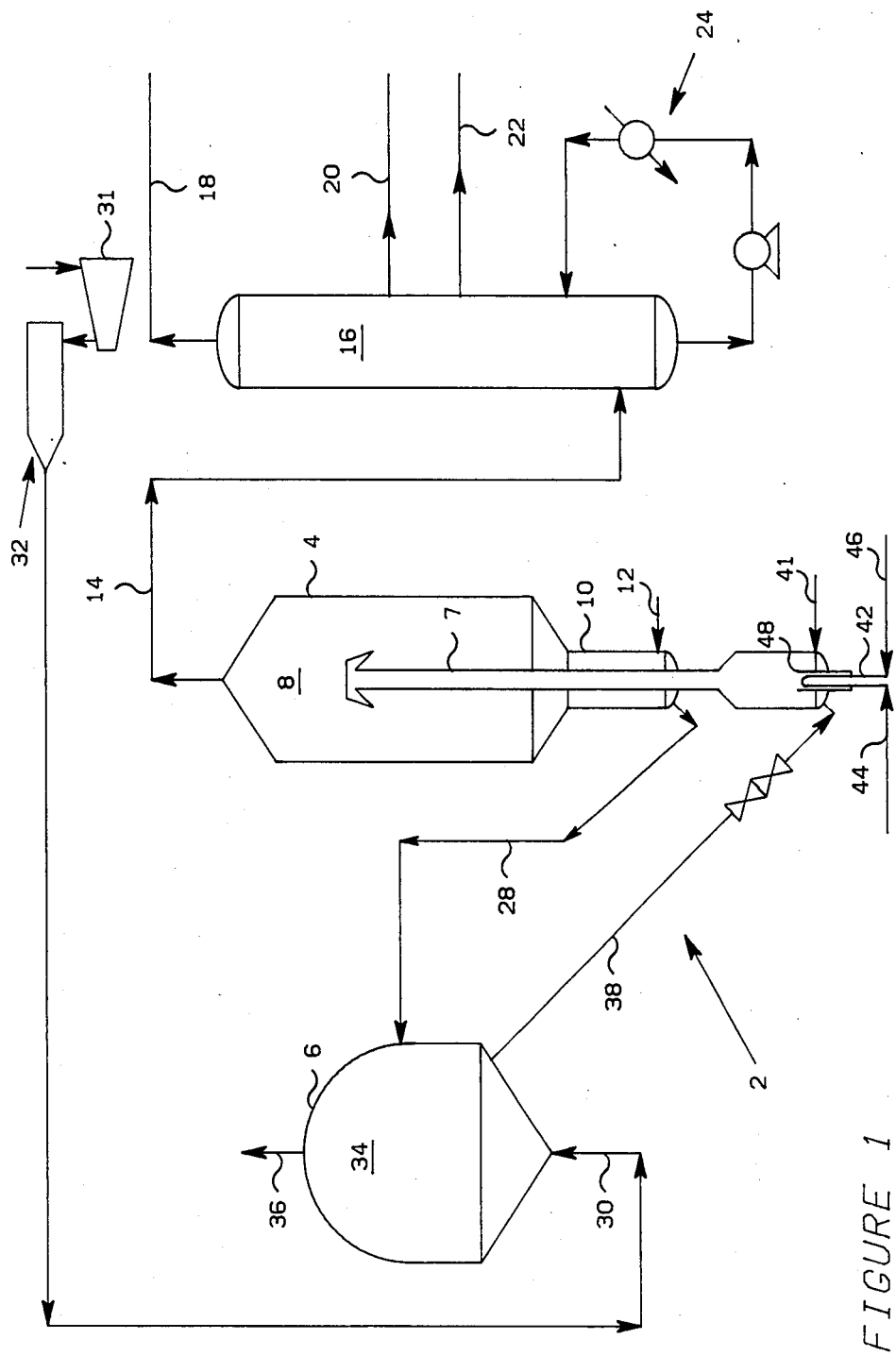
FIG. 1 illustrates certain aspects of a catalytic cracking unit.
Figure 2:
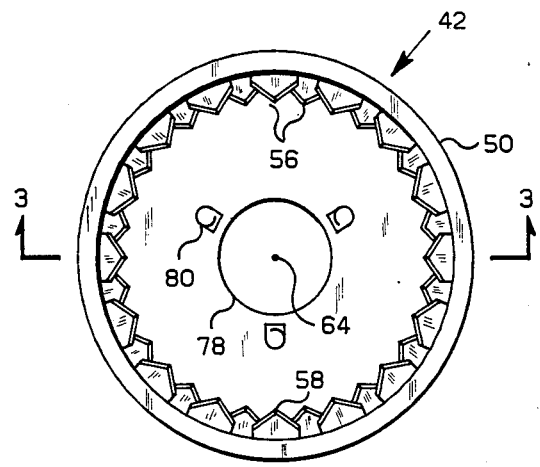
FIG. 2 illustrates in plan view an oil atomizer which can be employed in the system of FIG. 1.
Figure 3:
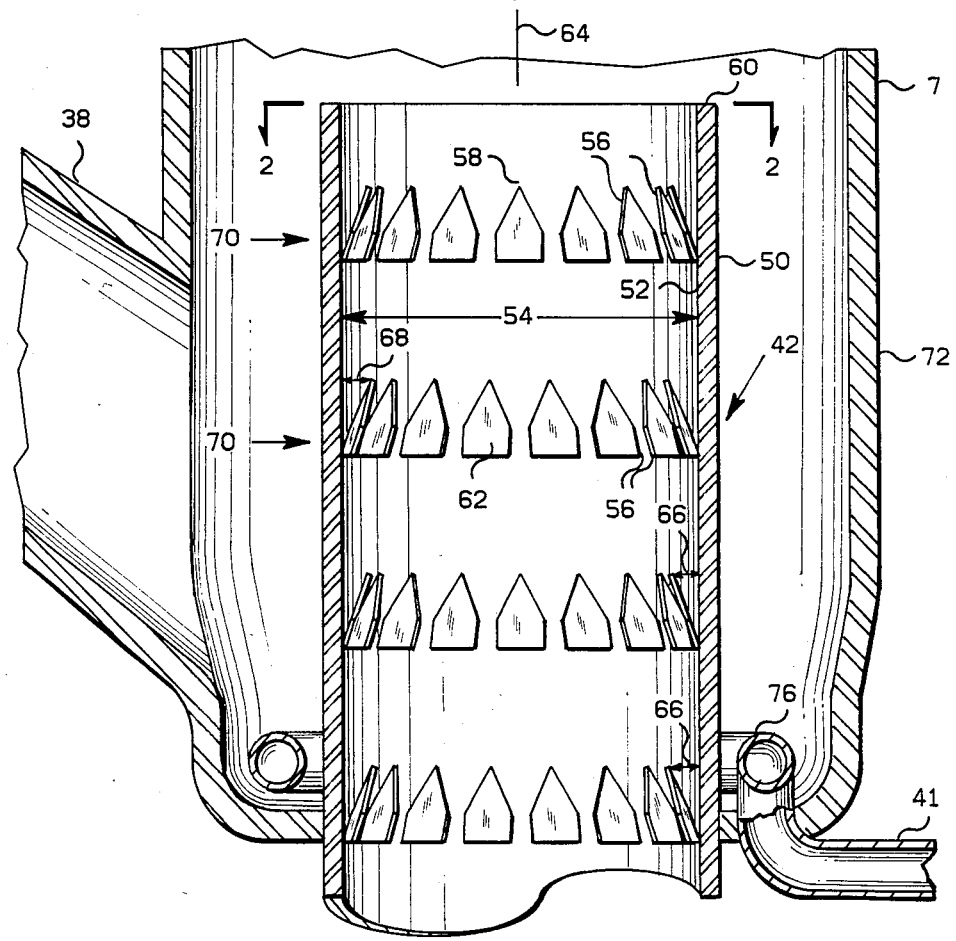
FIG. 3 illustrates the atomizer of FIG. 2 in cross section along lines 2—2 and positioned in a catalytic cracking unit.

With reference to FIG. 1, one type of a catalytic cracking unit 2 comprises a reactor 4 and a regenerator 6. The reactor 4 comprises a riser-reactor or transfer line reactor 7, a catalyst/product separation zone 8 which usually contains several cyclone separators, and a stripping section or zone 10 in which gas, usually steam such as introduced from line 12, strips entrained hydrocarbon from the coked catalyst. Overhead product from the separation zone 8 is conveyed via line 14 to a separation zone 16 such as the main fractionator where it is separated, for example, into light hydrocarbons which are withdrawn from the zone 16 by the line 18, gasoline range liquids which are withdrawn by the line 20, distillates which are withdrawn by the line 22, and slurry oils, cycle oils, unreacted feed and the like which can be reboiled in the reboiler means 24 as required.

After being stripped in the zone 10, the cracking catalyst is conveyed from the zone 10 to the regenerator 6 by line 28 for coke burnoff. In the regenerator 6, oxygen containing gas is introduced by a line 30 which is connected to a source of oxygen containing gas such as the air compressor 31 and heater 32. Coke deposits are burned from the catalyst in the regenerator 6 forming an effluent gas which is separated from the catalyst in a separation portion 34 of the regenerator 6 which usually contains a plurality of cyclone separators and withdrawn from the regenerator 6 by the line 36. Hot regenerated catalyst passes from the regenerator 6 to the riser-reactor 7 by line 38, which provides a source of hot cracking catalyst particles for the riser-reactor.

In the bottom of the riser-reactor 7, catalyst from the line 38 is fluidized with gas, usually steam, which is introduced into the riser-reactor 7 by line 41. The oil feedstock is introduced into the riser-reactor 7 via a nozzle 42 which preferably emits a fine mist axially into the riser-reactor at the lower end thereof. A line 44 connects the nozzle 42 with a suitable source of hydrocarbon feedstock. Atomizing gas such as steam can be added to the nozzle 42 by line 46 which connects the nozzle 42 to a suitable steam source. A tube or sheath 48 is preferably positioned surrounding the nozzle 42 in the bottom of the riser 7 to protect it from the circulating hot cracking catalyst. The bottom of the riser 7 surrounds the sheath 48 and the cracking catalyst and fluidizing gas are introduced into the annulus between the riser 7 and the sheath 48. The sheath 48 when present preferably extends past the upper end of the nozzle 42 and forms a mixing zone between the end of the feed pipe or nozzle and the catalyst stream in the riser.

The conditions in the riser-reactor 7 and regenerator 6 are well known to those of ordinary skill. Usually, the temperature in the riser-reactor 7 will be in the range of from about 850° to about 1050° F. The oil is usually admixed with steam at a weight ratio of oil to steam in the range of from about 10:1 to about 25:1. A catalyst oil weight ratio employed in the riser-reactor 7 is generally in the range of from about 3:1 to about 30:1, usually between about 3:1 and about 12:1. Pressure in the riser-reactor 7 is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser-reactor is generally up to between about 40 and about 90 feet per second in the upper portions. The contact time between the catalyst and oil in the riser-reactor is generally in the range of from about 1 to about 4 seconds, usually from 1.5 to about 3 seconds. The regenerator is operated at a temperature in the range of from about 1100° to about 1500° F. and is ordinarily provided with sufficient oxygen containing gas to reduce the coke on the catalyst to a level of about 0.5 weight percent or less, preferably less than 0.1 weight percent.

Catalyst suitable for catalytic cracking includes silica alumina or silica magnesia synthetic microspheres or ground gels and various natural clay-type or synthetic gel-type catalysts. Most preferably, fluidizable zeolite-containing cracking catalysts are employed.

The present invention has its greatest advantage in application to the catalytic cracking of oils, especially heavy petroleum gas oils. Typical heavy gas oils are either the higher boiling fractions of oil from a thermal cracking crude still, or from an atmospheric residuum hydrodesulfurization unit or one of the heavier recycle fractions from a gas oil fluid catalytic cracking unit or from a heavy oil catalytic cracking unit. Typical heavy gas oil will have an initial ASTM boiling point in the range of 250° F. to 350° F., a 50% ASTM boiling point in the range of 600° F. to 750° F. with an end point of 750° F. to 1000+° F. For heavy gas oils the density range is typically 10° to 30° API (1.000 to 0.88 g/cc specific gravity at 60° F.) with a wt.% sulfur range from 1.0 to 5.0 wt.% while the kinematic viscosity at 100° F. will range from 25 to 100 centistokes and the pour point will range from 20° F. to 80° F. Other oils can be blended with the gas oils if desired. Additional feedstock streams will usually be introduced into the unit by means not shown. Typical additional feedstocks are light gas oils, residual and slurry oils, for example as well as fresh feed.

The nozzle 42 is formed from a tubular member 50 having an inside surface 52 which defines an inside diameter 54. A plurality of turbulence generating members 56 are mounted on the interior surface 52 by a suitable means such as welding. At least a portion of the turbulence generating members 56 have a pointed tip 58 which points toward a first or downstream end 60 from which feedstock is emitted into the riser-reactor. At least a portion of the turbulence generating members 56 are provided with a ramp portion 62 which is inclined toward the longitudinal axis 64 of the tubular member 50 at an acute angle 66 with respect to the longitudinal axis 64. The ramp portion 62 leads to the pointed tip 58. The pointed tip is positioned apart from the interior surface 52 at a distance 68 generally in the range of from about 0.03 to about 0.3 inside diameters 54.

In certain embodiments the ramp portion 62 may have a twist or somewhat helical shape to transmit greater turbulence to fluid flow in nozzle 42.

To provide a good flow path for the oil feed it is desirable that at least some, preferably each, of the ramp portions 62 extend to the tip 58 from a position adjacent the interior surface 52 of the tubular member 50 to pick up the oil flow. The width of the ramp portions 62 as measured circumferentially with respect to the tubular member from the longitudinal axis 64 is generally in the range of from about 3° to about 30° (0.026–0.26 inside diameters) in order to provide a sufficiently large avenue for flow of oil to the tip 58.

Preferably, the pointed tips 58 of at least some of the plurality of turbulence generating members 56 are positioned apart from the interior surface 52 of the tubular member 50 at a distance 68 which is in the range of from about 0.05 to about 0.2 inside diameters and at least some of the ramp portions 62 have a width which is in the range of from about 5° to about 20° (0.044–0.17 inside diameters) as measured circumferentially from the longitudinal axis 64 of the tubular member 50.

In a preferred embodiment, each of the turbulence generating members 56 has a generally pentagonal shape with a pentagonal surface which forms the ramp 62 with one of the pieces of the pentagonal shape defining the pointed tip. The turbulence generating member 56 is affixed to the interior surface 52 of the tubular member 50 along the base of the pentagonal shape which is across from the pointed tip 58. It is expected, however, that triangular shaped turbulence generating members 56 could also be used with good results, as well as other shapes which have a pointed tip and a ramp portion which leads to it.

Although the turbulence generating members 56 can be affixed to the interior surface 52 of the tubular member 50 in a wide variety of arrays, one arrangement which is expected to yield good results is where the turbulence generating members 56 are arranged in a series of rings 70 which are longitudinally spaced apart along the interior surface 52 of the tubular member 50. Each of the rings 70 of turbulence generating members 56 extends generally circumferentially around the interior surface 52 of the tubular member 50. Preferably, the turbulence generating members 56 in adjacent rings 70 are circumferentially offset from each other so that the pointed tips 58 of only alternating rings are in substantial longitudinal alignment with each other. Where the rings each contain from 12 to 36 turbulence generating members, from 4 to about 12 rings, spaced apart at a distance in the range of ¼ to about 1 inside diameter of the tubular member, are expected to provide good results.

The tubular member 50 is usefully deployed in a lower portion 72 of the riser-reactor 7, preferably along the longitudinal axis of the riser-reactor 7. Line 38 provides a source of hot cracking catalyst particles connected to the lower portion 72 of the riser-reactor 7. Line 41 preferably connects to an annular distributor 76 which is positioned in the riser-reactor 7 between the tubular member 50 and the lower portion 72. The tubular member 50 preferably empties axially into the riser-reactor in the lower portion 72. Steam and oil sources such as lines 46 and 44 are connected to the tubular member 50. In one embodiment an optional general steam pipe 78 empties into a lower portion of the tubular member 50 and optional oil nozzles 80 spray an oil mist into the steam stream. However, where steam velocities are high enough it is generally not necessary to spray the oil into the steam stream. A second tubular member 48 which can be as shown in FIG. 1 preferably surrounds the tubular member containing the turbulence generating members and extends past the downstream end of the tubular member 50 to provide a mixing zone for the mist of steam and oil prior to its admixture with hot cracking catalyst.

According to other aspects of the invention, there is provided a process for catalytically cracking a normally liquid oil feedstock. The oil feedstock is first preferably heated to a temperature in the range of about 300° to 800° F. and then introduced into a feedstock pipe having an upper or downstream end which is axially positioned at the lower end of the riser-reactor and preferably empties into the riser-reactor. An atomizing gas, preferably steam, usually at a temperature in the range of 300° to 800° F. is introduced into the feedstock pipe at a sufficient rate to cause a portion of the normally liquid oil feedstock to concentrate along an interior surface of the pipe and flow toward the upper downstream end of the pipe. At least a portion of the thus concentrated oil is flowed from along the interior surface of the pipe up a plurality of ramps each of which terminates in a pointed tip which is spaced apart from the interior surface of the pipe. From the pointed tip the liquid oil feedstock is blown as droplets with the atomizing gas thus forming a mist of atomizing gas and the normally liquid oil feedstock. This mist is emitted from the upper or downstream end of the pipe and into the riser-reactor where it is contacted with a fluidized cracking catalyst and catalytically cracked into a product. Preferably, the mist flows through a mixing zone between the discharge end of the feedstock pipe and the circulating catalyst in the riser such as can be defined by a pipe sheath having a larger diameter than the feedstock pipe and extending past the upper downstream end of the feedstock pipe. The velocity of the atomizing gas and oil through the feedstock pipe is preferably sufficient to cause a concentration gradient in the pipe, the feedstock being concentrated along the wall of the pipe. This phenomenon is known as two-phase annular flow. The feedstock and steam mixture is generally emitted from the feedstock pipe at a velocity which is in the range of from about 25 to about 250 feet a second, usually at a velocity in the range of 25 to 100 feet per second. Generally, where the atomizing gas is steam, from about 0.02 to about 0.2 pounds of steam will flow together with each pound of oil through the feedstock pipe.

Best results are achieved where the droplet size in the mist is very fine because radiant energy from the hot cracking catalyst will quickly vaporize very small droplets. Preferably, the droplet size will be in the range of from about 20 to about 200 microns which is similar in size to the particles of fluidized cracking catalyst.

Exemplary materials of construction, flow rates and dimensions for one embodiment of the invention are shown in the following table:

TABLE

| Item | Material & Dimensions | Process Parameter |
| --- | --- | --- |
| Catalyst Pipe 38 | 28 inch I.D. carbon steel with 1" refractory lining | up to 30 tons catalyst/min design rate |
| Oil Feed Pipe 54 | 10 inch I.D. carbon steel | 10,000 bbl/day virgin gas oil + 4000 lb/hr steam |
| Ramps 62 | 4 rows of 16 ramps each, staggered between rows. The ramps are formed from carbon steel and coated with stellite #1. The rows are separated by 4-15/16 inches each. Each ramp is shaped as a right pentagon and has a length | |

TABLE-continued

| Item | Material & Dimensions | Process Parameter |
| --- | --- | --- |
| | of 2 in., a width of 1.25 in. and a thickness of 0.134 in. (10 gauge). Each ramp is inclined at a 15° angle and protrudes 0.518 inches into the feed pipe. | |

An additional 25,000 barrels/day of fresh feed and recycle would be charged by means not shown.

What is claimed is:

1. A tubular member having an interior surface which defines an inside diameter, a first end, a second end, a longitudinal axis, and a plurality of turbulence generating members mounted on said interior surface, at least a portion of said turbulence generating members having a pointed tip pointing toward the first end of the tubular member and a ramp portion inclined toward the longitudinal axis of the tubular member at an acute angle with respect to the longitudinal axis of said tubular member, said ramp portion leading to the pointed tip, wherein the turbulence generating members are arranged in a series of rings longitudinally spaced apart along the interior surface of the tubular member, each of said rings extending generally circumferentially around the interior surface of the tubular member and having in the range of 12 to 36 turbulence generating members;

a steam source connected to the inside of the tubular member; and an oil source connected to the inside of the tubular member.

2. Apparatus comprising a generally vertically oriented riser-reactor having a longitudinal axis;

a source of hot cracking catalyst particles connected to a lower portion of said riser-reactor;

a tubular member emptying into the lower portion of the riser-reactor along the longitudinal axis thereof, said tubular member having an upper end, an interior surface which defines an inside diameter, a longitudinal axis, and a plurality of turbulence generating members mounted on said interior surface in a series of rings spaced apart along the interior surface of the tubular member, at least a portion of said turbulence generating members having a pointed tip pointing toward the upper end of said tubular member and a ramp portion inclined toward the longitudinal axis of the tubular member at an acute angle with respect to the longitudinal axis of said tubular member and leading to the pointed tip, wherein the pointed tip of at least a portion of said plurality of turbulence generating members is positioned apart from the interior surface at a distance in the range of from about 0.05 to about 0.2 inside diameters and at least a portion of the ramp portions has a width as measured circumferentially in the range of from about 0.044 to about 0.17 inside diameters;

a steam source connected to the inside of the tubular member; and an oil source connected to the inside of the tubular member.

3. Apparatus as in claim 2 further comprising a second tubular member which surrounds the tubular member containing the turbulence generating members and extends past the upper end thereof wherein in the range of from 12 to 36 turbulence generating members are mounted in each of from 4 to about 12 rings spaced longitudinally along the inside of the tubular member.

* * * * *